United States Patent [19]

McMinn

[11] Patent Number: 4,490,619
[45] Date of Patent: Dec. 25, 1984

[54] HYDRAULICALLY DRIVEN GENERATOR SYSTEM WITH AIR CONDITIONING MEANS

[75] Inventor: Robert R. McMinn, Crosby, Tex.

[73] Assignee: Harrison Equipment Co., Inc., Stafford, Tex.

[21] Appl. No.: 475,913

[22] Filed: Mar. 16, 1983

[51] Int. Cl.³ ............................................ F01K 15/00
[52] U.S. Cl. ........................................ 290/2; 290/52; 290/40 R; 290/4 R; 60/445; 60/448; 60/484; 60/490
[58] Field of Search .................. 290/40 A, 40 B, 40 C, 290/40 E, 40 F, 40 R, 43; 60/445, 448, 484, 490, 660, 664, 665, 667, 686

[56] References Cited

U.S. PATENT DOCUMENTS

| | | | |
|---|---|---|---|
| 3,056,036 | 9/1962 | Gardner | 290/4 R |
| 3,675,112 | 7/1972 | Smith | 60/445 X |
| 4,010,378 | 3/1977 | Tharpe et al. | 290/2 |
| 4,117,344 | 9/1978 | Boerstler et al. | 290/40 C X |
| 4,368,773 | 1/1983 | Frater | 60/665 X |

OTHER PUBLICATIONS

Harrison Equipment brochure, "HYDRA-GEN ® Hydraulic Driven Generators".
Harrison Equipment brochure, "HYDRA-GEN ® Hydraulically Driven A.C. Generators".
Commercial Shearing, Inc. brochure, "Accudrive Constant Speed Electrohydraulic Drive".

*Primary Examiner*—B. Dobeck
*Assistant Examiner*—Paul Shik Luen Ip
*Attorney, Agent, or Firm*—Pravel, Gambrell, Hewitt & Kimball

[57] ABSTRACT

A hydraulic driven electric generator and air conditioning system for simultaneously generating controlled quality electrical power and producing air conditioning in a desired area has a variable displacement hydraulic pump for pumping a hydraulic fluid is driven by a prime engine means. The pump is hydraulically connected to a fixed displacement hydraulic motor which is powered by the fluid flow. The first motor drives an electrical generator means for generating electricity having a rotating blower fan mounted within a generator housing. A second hydraulic motor is hydraulically connected to the output of the first motor and is used to provide power to an air conditioning means. Means monitoring the passage of blower teeth of the rotating blower fan produces an electric output responsive to changes detected in the rotation of the blower fan. Servo control means are mounted with the hydraulic pump for controlling the hydraulic fluid displacement of the variable displacement hydraulic pump in response to the monitor means output to maintain an essentially constant rotation of the blower fan.

15 Claims, 1 Drawing Figure

HYDRAULICALLY DRIVEN GENERATOR SYSTEM WITH AIR CONDITIONING MEANS

FIELD OF THE INVENTION

The present invention relates generally to the field of portable electric generators and more particularly to hydraulically driven electric generator systems.

DESCRIPTION OF THE PRIOR ART

It has been known to produce electricity by means of an electrical generator diven by a hydraulic motor. The hydraulic motor is itself powered by the flow of hydraulic fluid pumped by a variable displacement hydraulic pump. Changing electric loads on the generator causes a fluctuation in the output frequency of the electric generator and results in a change in the hydraulic fluid flow. To counteract the change in the electric output, hydraulic sensing systems were first developed which actuated a servo control mounted on the variable displacement hydraulic pump to increase or decrease the hydraulic fluid flow. The hydraulic control had a slow response time and was not acceptable in situations where the maintenance of a precise electrical output was required.

In order to respond more quickly to changes in electrical output, electronic control systems have been developed. Telesis Controls Corporation of Chillicothe, Ohio sells one such generator system where an electronic controller receives an input signal from a magnetic pick-up mounted inside the generator fan housing to monitor the RPM of the generator. The controller also simultaneously monitors the RPM of the prime mover engine which drives the variable displacement hydraulic pump to provide an anticipatory circuit for the electronic controller. However, engine speed varies widely depending on the type and manufacturer and many different types of engines have been used as the prime mover for hydraulic pumps. A drawback of this type of system is that since each engine generally requires unique hardware for the pick-up, separate hardware sets were necessary for each engine for use with generators.

Commercial Shearing, Inc. also advertises a constant speed hydraulic drive under the name of "Accudrive" which is offered as a generator drive where accurate motor speed is necessary. This control has a pulse pick-up to monitor the output speed of the motor or generator and a pressure pick-up for simultaneously monitoring the system's hydraulic pressure. The electronic control uses the two inputs to produce signals which are transmitted to an electro-servo control on the variable displacement pump.

SUMMARY OF THE INVENTION

These problems are overcome by the present invention which simultaneously controls a hydraulically driven electric generator and air conditioning (cooling/heating) system for simultaneously controlling the output of a generator and producing air conditioning by cooling or heating a desired area. A variable displacement hydraulic pump for pumping a hydraulic fluid is driven by a prime engine. The pump is hydraulically connected to a fixed displacement hydraulic motor which is powered by fluid flow from the pump. The hydraulic motor drives an electric generator which has a rotating blower fan mounted within the generator housing. A second hydraulic motor is driven by the hydraulic output of the first motor and provides power to an air conditioning system for regulating temperature in a desired area.

The hydraulic output from the second motor is connected to the variable displacement pump and forms a closed hydraulic loop. Blower fan speed is monitored by detecting the speed of blower teeth, which produces a signal which changes in response to changes in speed of the blower fan. Servo controls are connected to the hydraulic pump for controlling its hydraulic fluid displacement in response to changes in blower fan speed for maintaining an essentially constant rotation of the blower fan.

Brief Description of the Drawing

The invention will be better understood by reference to the detailed description of a preferred embodiment set forth below when considered together with the appended drawing, in which.

Detailed Description of a Preferred Embodiment

Figure 1:
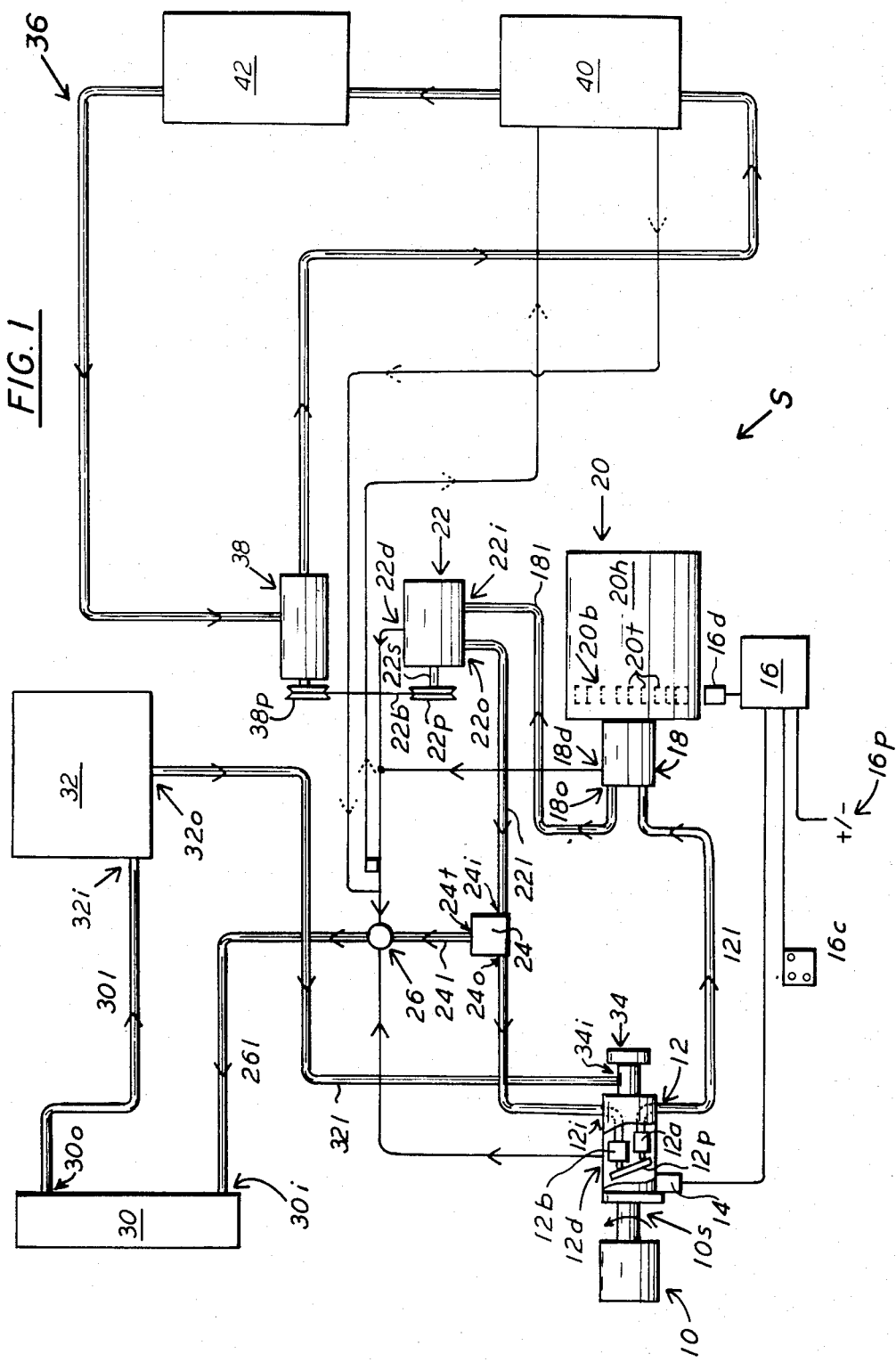
FIG. 1 is a schematic diagram of the hydraulic control system of the present invention.

Referring to FIG. 1, a hydraulically driven electric generator and air conditioning system S of the present invention simultaneously generates controlled amounts of electrical power and produces power for a secondary load 36. A variable-displacement, hydraulic pump 12 is driven by a prime engine 10. A first, fixed-displacement, hydraulic motor 18 is driven by hydraulic fluid pumped by the hydraulic pump 12 through a line 12$l$. The motor 18 drives an electric generator 20 which has a blower fan 20$b$ with blower teeth 20$t$. A second, fixed-displacement, hydraulic motor 22 receives hydraulic fluid from a line 18$l$ connected at an outlet 18$o$ of the first motor 18 and energizes an air conditioner/heater generally designated by numeral 36 for regulating the temperature in a desired area. An output 22$o$ of the second motor 22 is hydraulically connected through a line 22$l$ with an input 12$i$ of the variable displacement pump 12 to form an essentially closed hydraulic loop.

A monitor 16, of a type known to those with ordinary skill in the art, is mounted on the generator 20 and produces an electric signal responsive to changes detected in the rotation of the blower fan 20 $b$. Rexroth Corporation manufactures an electronic controller suitable for the present invention. A servo control 14 is mounted with the variable-displacement, hydraulic pump 12 for controlling the hydraulic fluid displacement of the pump 12 to maintain as essentially constant rotation of the blower fan 20$b$ in response to the output of the monitor 16.

The engine 10 is a prime engine or, alternatively, an auxiliary engine having a power takeoff on a shaft 10$s$. Engine 10 can be powered by diesel fuel or gasoline.

The variable-displacement, hydraulic pump 12 can be of the type A4V manufactured by Hydromatik GMBH of Ulm, Germany (a member of the Rexroth-Group). The pump generally has at least two pistons 12$a$ and 12$b$ which are operated by an adjustable swash plate 12$p$. By adjusting the angle of the swash plate 12$p$, either pressure or flow changes in the hydraulic fluid are produced to maintain a constant speed in the first hydraulic motor 18.

The motor 18 is a typical, fixed-displacement, hydraulic motor which is powered by the flow of hydraulic fluid pumped from the variable-displacement pump 12. The motor 18 is connected to the electric generator 20 for producing electrical power and is sized for the desired operation of the generator 20.

The generator 20 can be a model YD manufactured by Onan Corporation, Minneapolis, Minnesota. The generator 20 has a generator housing 20h which encloses a blower fan 20b and has blower teeth 20t mounted to an armature (not shown). Generally, there are 24 blower teeth evenly spaced on the circumference of the blower fan 20b.

For a 60 cycle per second (or Hertz) current, the blower teeth 20t will rotate past a single point chosen on the generator housing 20h at the rate of 720/second, e.g., 24 teeth 20t per revolution of fan 20b multiplied by 30 revolutions per second. As the electric output frequency deviates from 60 Hertz, the number of blower teeth 20t passing the chosen point varies proportionately. Previous generator monitoring systems monitored only the revolutions per minute (RPM) of the generator shaft, which in this example is 30 revolutions per second. Thus, while the blower 20b, which is mounted to the generator shaft, may make one complete revolution past the fixed point, considerably more than one tooth pass that same point, e.g., 720 versus 30 per second in this example. Monitoring the blower teeth 20t instead of shaft revolutions permits a more accurate monitoring of the output frequency since correcting for a change across several blower teeth results in a much smaller deviation from the desired 60 Hertz compared to shaft revolutions.

The monitor 16 continuously monitors the output of the generator 20 by detecting changes in the rotation of teeth 20t of the blower 20b. Preferably, the pick-up 16d of the monitor 16 is mounted on the generator housing 20h for detecting the passage of the blower teeth 20t as the blower 20b rotates. The pick-up 16d and the monitor 16 determine the rate of passage of the blower teeth 20t rotating past the pick-up 16d and produce an electrical signal or output responsive to changes detected in the rate of passage. In the above example, if it has been determined that the generator 20 produces the desired 60 Hertz electrical output when the blower teeth 20t pass pick-up 16d at the rate of 720 teeth per second, then any deviation either above or below the rate of 720 teeth per second detected by the pick-up 16d and the monitor 16 results in an electric signal which operates to adjust the hydraulic fluid flow to return the rate to the desired 720 teeth per second rate. An electric source 16p provides the initial electric power necessary for operation of the monitor 16 until sufficient power is generated by generator 20 which then powers the monitor 16 while electric source 16p is disconnected. A remotely-located control 16c controls the operation of the monitor 16 and includes an on-off switch (not shown).

The output produced by the monitor 16 responsive to changes in the rate of passage of blower teeth 20t is electrically connected to either a servo or proportional solenoid control 14 which is mounted with the variable-displacement, hydraulic pump 12. Changes in the detected rate are signaled to the servo control 14 which adjusts the angle of the swash plate 12p for either pressure or flow changes necessary to maintain the desired speed of the motor 18 which controls rotation of the blower 20b at the desired level.

Preferably, the second motor 22 which, as mentioned above, is driven by hydraulic fluid supplied from the motor 18, includes a shaft 22s with a pulley 22p mounted on it. A pulley belt 22b extends between the pulley 22p and a second pulley 38p that is connected to a compressor 38 for joining them. The compressor 38, an evaporator/heater 40 and a condensor 42 make up a typical air conditioning system generally designated by reference numeral 36 and are hydraulically joined in a closed system. Air conditioning system 36 performs the dual functions of acting in either a heater or air cooling mode, as desired, to condition or regulate the air in a desired area.

A T-valve 24 is provided in the hydraulic line 22l between the output 22o and the input 12i. The T-valve 24 has an input 24i, a primary outlet 24o and a t-outlet 24t, the latter being hydraulically connected through a line 24l to a one-way flow junction 26. The junction 26 is hydraulically connected through a line 26l to an inlet 30i of a cooler 30. The cooler 30 is a known type of hydraulic cooler which operates to reduce the temperature of the hydraulic fluid. An outlet 30o of the cooler 30 is hydraulically connected through the line 30l to an inlet 32i of a reservoir 32. The reservoir 32 holds the excess hydraulic fluid for return to the system to maintain the fluid at a desired level.

An output 32o of the reservoir 32 is hydraulically connected through a hydraulic line 32l to an inlet 34o of a charge or injection pump 34, the latter being mounted on the pump 12 for injecting hydraulic fluid from the reservoir 32 into the system to maintain a desired level of hydraulic fluid.

Each of the hydraulic motors and hydraulic pumps described above include a case drain through which a portion of the hydraulic fluid flows. This portion of the fluid acts to lubricate the internal moving parts of the respective pump or motor. Case drains 12d, 18d and 22d are connected to the elements 12, 18 and 22, respectively, and are in turn connected hydraulically to the junction 26 for returning the drained hydraulic fluid to the reservoir for subsequent injection into the system. It is preferable that a portion of the hydraulic fluid flowing from the case drains 18d and 22d flow through the evaporator 40 to afford heating capabilities in cold weather situations. This portion of the hydraulic fluid flowing to the evaporator 40 is returned to the hydraulic line leading to the junction 26.

An alternative embodiment of the present invention would include yet another hydraulic motor (not shown) connected hydraulically in series after the second motor 22 and before the t-valve 24. An example of such a third motor is a rotary flow device, D series, manufactured by John S. Barnes Corporation of Rockford, Illinois. In such a rotary flow device, hydraulic fluid would flow through one cell of a divider (not shown) which includes four cells (not shown). The output from the remaining cells can provide power for yet other motors. An example of the use for such rotary flow divider is to power the fan of the air conditioning system 36 to reduce or eliminate dependence on electrical power.

Operation

In operation of the present invention, the prime mover 10 is connected to the variable-displacement, hydraulic pump 12. As the pump 12 circulates the hydraulic fluid in the closed hydraulic loop, the first motor 18 is energized. The resulting mechanical power from the first motor 18 is connected to the electrical generator 20 and is used to produce electrical power. At the same time, the second hydraulic motor 22 is energized by the flow of hydraulic fluid and provides the mechanical power to operate the air conditioner 36. The monitor 16 monitors the passage of the blower teeth 20t as they rotate. If the rate of passage of the teeth 20t deviates from the desired rate, the monitor 16 produces an electric signal which is transmitted to the servo or proportional solenoid control 14 which, in turn, adjusts the cycle of the swash plate 12p for changing the pressure or flow of the hydraulic fluid. This changes the output of motor 18 which ultimately either increases or decreases the movement rate of the blower teeth 20t an operates to return the electric output from the generator 20 to its desired level.

Similarly, if the load on any other hydraulic motor in series with the first motor 18 and the pump 12 changes, such as the effect upon the second motor 22 by turning on the compressor 38, the change in load produces a corresponding change in hydraulic fluid flow. This change in fluid flow results in a variation of the power output from the motor 18 which is ultimately reflected in the increase or decrease in rotational speed of the blower teeth 20t. This change induces the adjustment of the fluid pressure or flow as described above and returns the electric output to the desired level. The present invention compensates for any changes in load upon any number of hydraulic motors in series with motor 18 and pump 12 to maintain more accurately the desired electrical output from the generator 20.

The foregoing disclosure and description of the invention are intended to be illustrative and explanatory only, and various changes in the size, shape and materials, as well as in the details of the illustrated construction may be made without departing from the spirit of the invention, as such changes are intended to fall within the scope of the appended claims.

I claim:

1. A hydraulically driven electric generator and secondary load system for simultaneously generating controlled quality electrical power and producing power to a secondary load, comprising:
   a hydraulic pump for pumping a hydraulic fluid;
   drive means for driving said pump;
   a first hydraulic motor;
   means for hydraulically connecting the pump to the first hydraulic motor for supplying fluid to drive the motor;
   electrical generating means for generating an electrical output;
   means for connecting the first motor to the generating means so that the motor can drive the generating means;
   a second hydraulic motor for providing power to a secondary load;
   means for hydraulically connecting the first motor to the second motor for supplying fluid to drive the second motor;
   means for hydraulically connecting the second motor to the pump for forming a closed hydraulic system;
   monitor means for monitoring the speed of said generator and producing a signal responsive to changes detected in the output from said generator; and,
   control means connected to the monitor means for receiving said signal and controlling the hydraulic fluid displacement of the hydraulic pump and maintaining an essentially constant output of said generator in response to said signal.

2. The system of claim 1, wherein the first motor includes a fixed displacement, hydraulic motor.

3. The system of claim 1 wherein:
   said electric generator means includes a rotating blower fan with blower teeth mounted within a generator housing; and
   said monitor means including pick-up means mounted on said generator housing for detecting the passage of the blower teeth and electronic rate means for producing said electric signal responsive to changes in the rate of passage of said blower teeth.

4. The system of claim 3 and further including:
   a T-valve mounted in the means for connecting the second motor to said pump for withdrawing a portion of said hydraulic fluid;
   cooling means hydraulically connected to said T-valve for cooling said hydraulic fluid;
   reservoir means hydraulically connected to said cooling means for maintaining a supply of said hydraulic fluid; and,
   a charge pump mounted with said hydraulic pump for injecting a controlled amount of hydraulic fluid into said hydraulic pump to maintain a constant volume of hydraulic fluid; said charge pump being hydraulically connected to said reservoir.

5. The invention of claim 4 wherein:
   said first motor, hydraulic pump and second motor include case drains each hydraulically connected to said cooling means.

6. The invention of claim 1 wherein the secondary load comprises:
   air conditioning means energized by said second motor for regulating the temperature in a desired area.

7. The invention of claim 6 and further including:
   pulley means extending between said second motor and said air conditioning means for transmitting rotational energy from said second motor to said air conditioning means.

8. A hydraulic driven electric generator and system for generating controlled quality electrical power, comprising:
   a hydraulic pump for pumping a hydraulic fluid;
   drive means for driving said pump;
   a first hydraulic motor;
   means for hydraulically connecting said hydraulic pump to said motor;
   electric generating means for generating electricity;
   means for connecting the first motor to the generating means so that the first motor can drive the generating means;
   said electric generator means having a rotating member with a plurality of discrete elements spaced around the member which rotate when the member rotates, the rotation of said member being proportional to the electrical output of the generator means, said rotating member comprises a blower fan and said plurality of discrete elements include blower teeth;
   monitor means for monitoring the rotation of said blower teeth and producing a signal responsive to changes detected in the rotation of said blower teeth; and,
   control means connected to the monitor means for receiving said signal and controlling the hydraulic fluid displacement of the pump and maintain an essentially constant rotation of said rotating member in response to said signal.

9. The system of claim 8, wherein the first motor includes a fixed displacement, hydraulic motor.

10. The system of claim 8 wherein:
said monitor means including pick-up means mounted on said generator housing for detecting the passage of the blower teeth and electronic rate means for producing said electric signal responsive to changes in the rate of passage of said blower teeth.

11. The system of claim 8 and further including second hydraulic motor for providing power to a secondary load,
 means for hydraulically connecting the first motor to the second motor for supplying fluid to drive the second motor; and,
 means for hydraulically connecting the second motor to the pump for forming a closed hydraulic system.

12. The system of claim 11 and further including:
a T-valve mounted in the means for connecting the second motor to said pump for withdrawing a portion of said hydraulic fluid;
cooling means hydraulically connected to said T-valve for cooling said hydraulic fluid;
reservoir means hydraulically connected to said cooling means for maintaining a supply of said hydraulic fluid; and,
a charge pump mounted with said hydraulic pump for injecting a controlled amount of hydraulic fluid into said hydraulic pump to maintain a constant volume of hydraulic fluid; said charge pump being hydraulically connected to said reservoir.

13. The invention of claim 12 wherein:
said first motor, hydraulic pump and second motor include case drains each hydraulically connected to said cooling means.

14. The invention of claim 11 wherein the secondary load comprises:
air conditioning means energized by said second motor for regulating the temperature in a desired area.

15. The invention of claim 14 and further including:
pulley means extending between said second motor and said air conditioning means for transmitting rotational energy from said second motor to said air conditioning means.

* * * * *